(12) United States Patent
Aug et al.

(10) Patent No.: US 11,285,711 B2
(45) Date of Patent: Mar. 29, 2022

(54) ADHESION OF A SUBSTRATE ONTO A CMC COMPONENT

(71) Applicant: General Electric Company, Schenectady, NY (US)

(72) Inventors: Daniel James Aug, Cleves, OH (US); Joshua Daniel Brown, Hamilton, OH (US); Aaron Michael Dziech, Crittenden, KY (US); Joseph Herbert Fields, Fort Thomas, KY (US); Kenneth Michael Gessner, Lawrenceburg, IN (US)

(73) Assignee: General Electric Company, Schenectady, NY (US)

( * ) Notice: Subject to any disclaimer, the term of this patent is extended or adjusted under 35 U.S.C. 154(b) by 468 days.

(21) Appl. No.: 15/490,138

(22) Filed: Apr. 18, 2017

(65) Prior Publication Data
US 2018/0297346 A1  Oct. 18, 2018

(51) Int. Cl.
*B32B 37/12* (2006.01)
*B32B 7/12* (2006.01)
*B32B 9/00* (2006.01)
*F23R 3/00* (2006.01)

(52) U.S. Cl.
CPC ............... *B32B 37/12* (2013.01); *B32B 7/12* (2013.01); *B32B 9/005* (2013.01); *F23R 3/002* (2013.01); *B32B 2255/06* (2013.01); *B32B 2255/20* (2013.01); *F23R 2900/00017* (2013.01); *F23R 2900/00018* (2013.01); *Y02T 50/60* (2013.01)

(58) Field of Classification Search
CPC ........... B32B 37/12; B32B 7/12; B32B 9/005; B32B 2255/06; B32B 2255/20; B32B 2255/28; F23R 3/002; F23R 2900/00017; F23R 2900/00018; Y02T 50/6765; Y10T 428/24174; Y10T 428/24182; Y10T 428/24273; Y10T 428/24322; Y10T 428/24942; Y10T 428/2495; Y10T 428/24959; Y10T 428/24967
USPC ....... 428/119, 120, 131, 137, 212, 213, 214, 428/215, 220; 244/171.8
See application file for complete search history.

(56) References Cited

U.S. PATENT DOCUMENTS

| 4,304,137 | A | 12/1981 | Mott |
| 5,338,928 | A | 8/1994 | Jamieson et al. |
| 6,335,105 | B1* | 1/2002 | McKee .............. C04B 37/023 416/241 B |
| 6,666,082 | B2 | 12/2003 | Watanabe et al. |
| 6,838,157 | B2 | 1/2005 | Subramanian |

(Continued)

*Primary Examiner* — Megha M Gaitonde
(74) *Attorney, Agent, or Firm* — Dority & Manning, P.A.

(57) ABSTRACT

Methods for adhering a substrate onto a surface of a ceramic component are provided. The method may include applying a first bond coating onto an attachment surface of the substrate, applying a first alumina coating onto the first bond coating on the attachment surface of the substrate, applying a second bond coating onto an outer surface of the ceramic component, applying a second alumina coating onto the second bond coating on the attachment surface of the substrate, applying a cement onto at least one of the first alumina coating and the second alumina coating, and adhering the attachment surface of the substrate onto the outer surface of the ceramic component. Connections between a metal substrate and a ceramic matrix composite component are also provided.

13 Claims, 5 Drawing Sheets

(56) References Cited

U.S. PATENT DOCUMENTS

| | | |
|---|---|---|
| 7,181,972 B2 | 2/2007 | Dasgupta et al. |
| 7,582,359 B2 | 9/2009 | Sabol et al. |
| 8,151,623 B2 | 4/2012 | Shinde et al. |
| 8,742,944 B2 | 6/2014 | Mitchell et al. |
| 2005/0287386 A1 | 12/2005 | Sabol et al. |
| 2010/0247953 A1* | 9/2010 | Bossmann ............ C04B 37/005 428/623 |
| 2016/0348531 A1* | 12/2016 | Rice ........................ F01D 17/08 |

* cited by examiner

ADHESION OF A SUBSTRATE ONTO A CMC COMPONENT

FIELD

This invention relates to the adhesion of a substrate onto a thermal barrier coating (TBC) of a ceramic matrix composite (CMC) component capable of use on components exposed to high temperatures, such as the hostile thermal environment of a gas turbine engine.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from super alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

No matter the material of the component and its respective barrier coating, there is often a need to attach a smaller substrate (e.g., a sensor or other substrate) onto the surface of the coated component. However, it has been found that high-temperature cements will not adhere metal substrates onto the coated substrate, as it will eventually deteriorate after use such as in the environment of a gas turbine engine.

As such, a need exists for improved adherence of metal substrates onto barrier coated components, particularly EBC coated CMC components.

BRIEF DESCRIPTION

Aspects and advantages of the invention will be set forth in part in the following description, or may be obvious from the description, or may be learned through practice of the invention.

Methods are generally provided for adhering a substrate onto a surface of a ceramic component. In one embodiment, the method includes applying a first bond coating onto an attachment surface of the substrate, applying a first alumina coating onto the first bond coating on the attachment surface of the substrate, applying a second bond coating onto an outer surface of the ceramic component, applying a second alumina coating onto the second bond coating on the attachment surface of the substrate, applying a cement onto at least one of the first alumina coating and the second alumina coating, and adhering the attachment surface of the substrate onto the outer surface of the ceramic component.

A connection is also generally provided between a metal substrate and a ceramic matrix composite component. In one embodiment, the connection is formed from a first bond coating and a first alumina coating on an attachment surface of the substrate, a second bond coating and a second alumina coating on an outer surface of the ceramic component, and a cement positioned between the attachment surface on the substrate and the surface of the ceramic component, with the first alumina coating and the second alumina coating facing each other.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
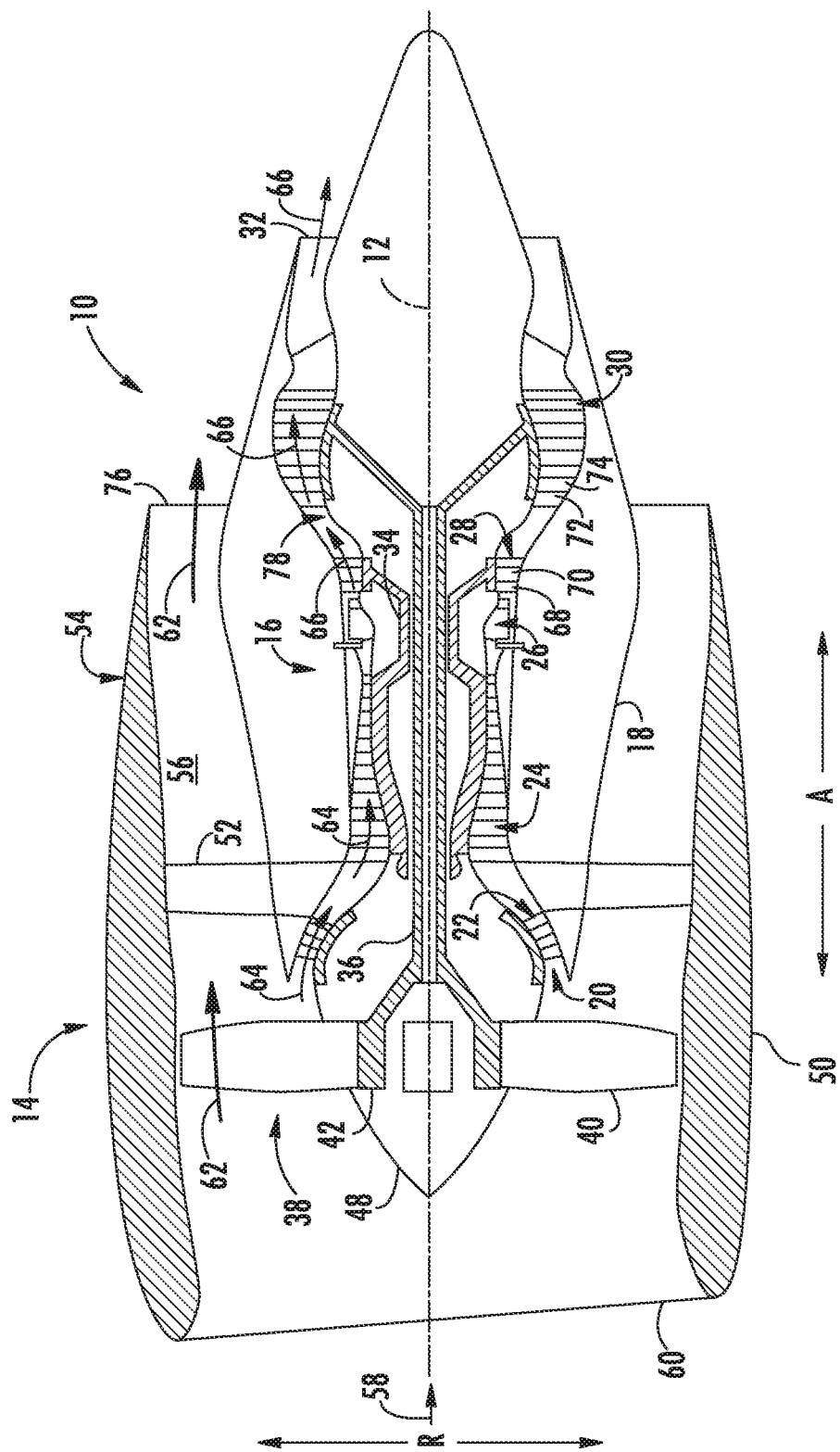
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Ceramic components are generally provided that have a substrate adhered onto its outer surface. The connection described herein allows for adherence of metal substrates to non-metallic parts by, in one embodiment, combining flame spray techniques with high temperature cement to get good adhesion of a metal substrate to a CMC material. In certain embodiments, at least one metal retainer is also used to aide in the connection between the ceramic component and the substrate adhered thereon. Such a connection is particularly suitable for CMC components used in high temperature applications, such as in gas turbine engines.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." Although further described below with reference to a turbofan engine 10, the present disclosure is also applicable to turbomachinery in general, including turbojet, turboprop, and turboshaft gas turbine engines, including marine and industrial turbine engines and auxiliary power units. As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 2:
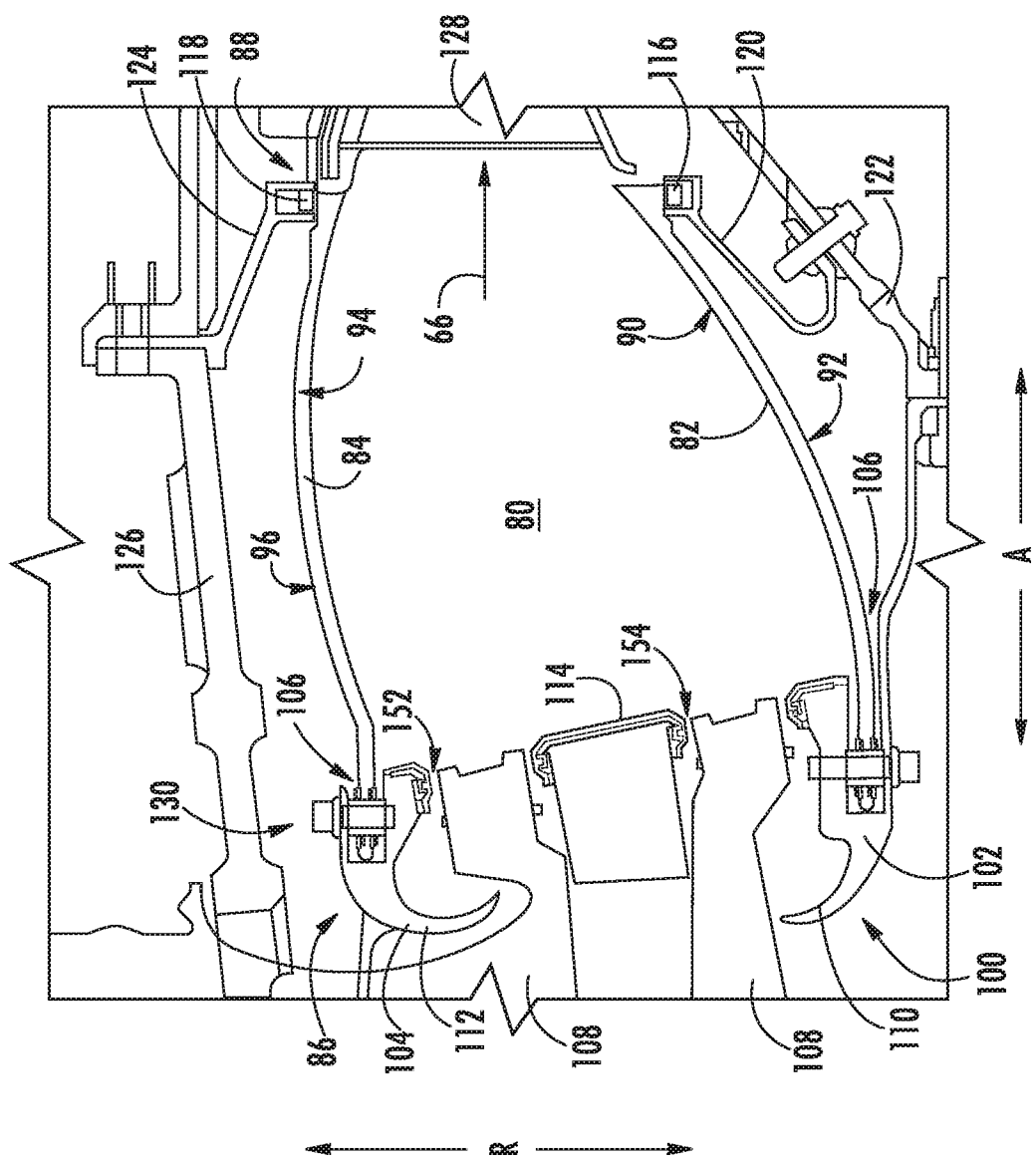
FIG. 2 is a perspective, cross-sectional view of a combustor assembly in accordance with an exemplary embodiment of the present disclosure.

Referring now to FIG. 2, a schematic, cross-sectional view is provided of a combustor assembly 79 according to an exemplary embodiment of the present subject matter. More particularly, FIG. 2 provides a side, cross-sectional view of an exemplary combustor assembly 79, which may, for example, be positioned in the combustion section 26 of the exemplary turbofan engine 12 of FIG. 1.

Combustor assembly 79 depicted in FIG. 2 generally includes a combustion chamber 80 defined by an inner liner 82 and an outer liner 84, e.g., combustion liners 82, 84 together at least partially define combustion chamber 80 therebetween. Combustion liners 82, 84, or other components of combustor assembly 79, may be made from a ceramic matrix composite (CMC) material as further described below. Combustor assembly 79 extends generally along the axial direction A from a forward end 86 to an aft end 88. Inner liner 82 generally defines a hot side 90 exposed to and defining in part a portion of the hot gas path 78 extending through the combustion chamber 80. Inner liner 82 further defines a cold side 92 opposite hot side 90. Similarly, outer liner 84 also defines a hot side 94 exposed to and defining in part a portion of the hot gas path 78 extending through the combustion chamber 80, and outer liner 84 further defines a cold side 96 opposite hot side 94.

The inner and outer liners 82, 84 are each attached to an annular dome 100 at the forward end 86 of combustor assembly 79. More particularly, dome 100 includes an inner dome section 102 attached to inner liner 82 and an outer dome section 104 attached to outer liner 84. The inner and outer dome sections 102, 104 may each extend along a circumferential direction C (FIG. 3) to define an annular shape. Inner and outer dome sections 102, 104 each also define a slot 106 for receipt of inner liner 82 and outer liner 84, respectively.

Combustor assembly 79 further includes a plurality of fuel air mixers 108 spaced along the circumferential direction and positioned at least partially within the dome 100. More particularly, the plurality of fuel air mixers 108 are disposed at least partially between outer dome section 104 and inner dome section 102 along the radial direction R. Compressed air from the compressor section of the turbofan engine 10 flows into or through the fuel air mixers 108, where the compressed air is mixed with fuel and ignited to create the combustion gases 66 within the combustion chamber 80. The inner and outer dome sections 102, 104 are configured to assist in providing the flow of compressed air from the compressor section into or through the fuel air mixers 108. For example, inner dome section 102 includes an inner cowl 110, and outer dome section 104 similarly includes an outer cowl 112. The inner and outer cowls 110, 112 may assist in directing the flow of compressed air from the compressor section into or through one or more of the fuel air mixers 108.

In certain exemplary embodiments, the inner dome section 102 with inner cowl 110 may be formed integrally as a single annular component, and similarly, the outer dome section 104 with outer cowl 112 also may be formed integrally as a single annular component. It should be appreciated, however, that in other exemplary embodiments, the inner dome section 102 and/or the outer dome section 104 alternatively may be formed by one or more components being joined in any suitable manner. For example, with reference to the outer dome section 104, in certain exemplary embodiments, outer cowl 112 may be formed separately from outer dome section 104 and attached to outer dome section 104 using, e.g., a welding process. Additionally or alternatively, the inner dome section 102 may have a similar configuration.

Referring still to FIG. 2, the exemplary combustor assembly 79 further includes a heat shield 114 positioned around the fuel air mixer 108 as depicted. The exemplary heat shield 114, for the depicted embodiment, is attached to and extends between inner and outer dome sections 102, 104. The heat shield 114 is configured to protect certain components of the turbofan engine 10 from the relatively extreme temperatures of the combustion chamber 80, as described in greater detail below.

Keeping with FIG. 2, combustor assembly 79 at the aft end 88 includes an inner piston ring seal 116 at inner liner 82 and an outer piston ring seal 118 at outer liner 84. The inner piston ring seal 116 is attached to an inner piston ring holder 120 extending from and attached to an inner casing 122. Similarly, the outer piston ring seal 118 is attached to an outer piston ring holder 124 extending from and attached to an outer casing 126. Inner piston ring holder 120 and outer piston ring holder 124 are configured to accommodate an expansion of the inner liner 82 and the outer liner 84 generally along the axial direction A, as well as generally along the radial direction R. To allow for a relative thermal expansion between the outer liner 84 and the outer dome section 104, as well as between the inner liner 82 and the inner dome section 102, a plurality of mounting assemblies 130 are used to attach outer liner 84 to outer dome section 104 and inner liner 82 to inner dome section 104. More particularly, the mounting assemblies 130 attach the forward end of outer liner 84 to outer dome section 104 within the slot 106 of outer dome section 104 and the forward end of inner liner 82 to inner dome section 102 within the slot 122 of inner dome section 102.

Further, as is discussed above, the combustion gases 66 flow from the combustion chamber 80 into and through the turbine section of the turbofan engine 12, where a portion of thermal and/or kinetic energy from the combustion gases 66 is extracted via sequential stages of turbine stator vanes and turbine rotor blades. A stage one (1) stator vane 128 is depicted schematically in FIG. 2, aft of the combustor assembly 79.

In some embodiments, components of turbofan engine 10, particularly components within hot gas path 78 such as components of combustion assembly 79, may comprise a ceramic matrix composite (CMC) material, which is a non-metallic material having high temperature capability. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. However, CMC components may be used in other sections as well, such as the compressor and/or fan sections. As a particular example described in greater detail below, heat shield 114 for combustor dome 100 may be formed from a CMC material to provide protection to the dome from the heat of the combustion gases, e.g., without requiring cooling from a flow of fluid as is usually required for metal heat shields.

Figure 3:
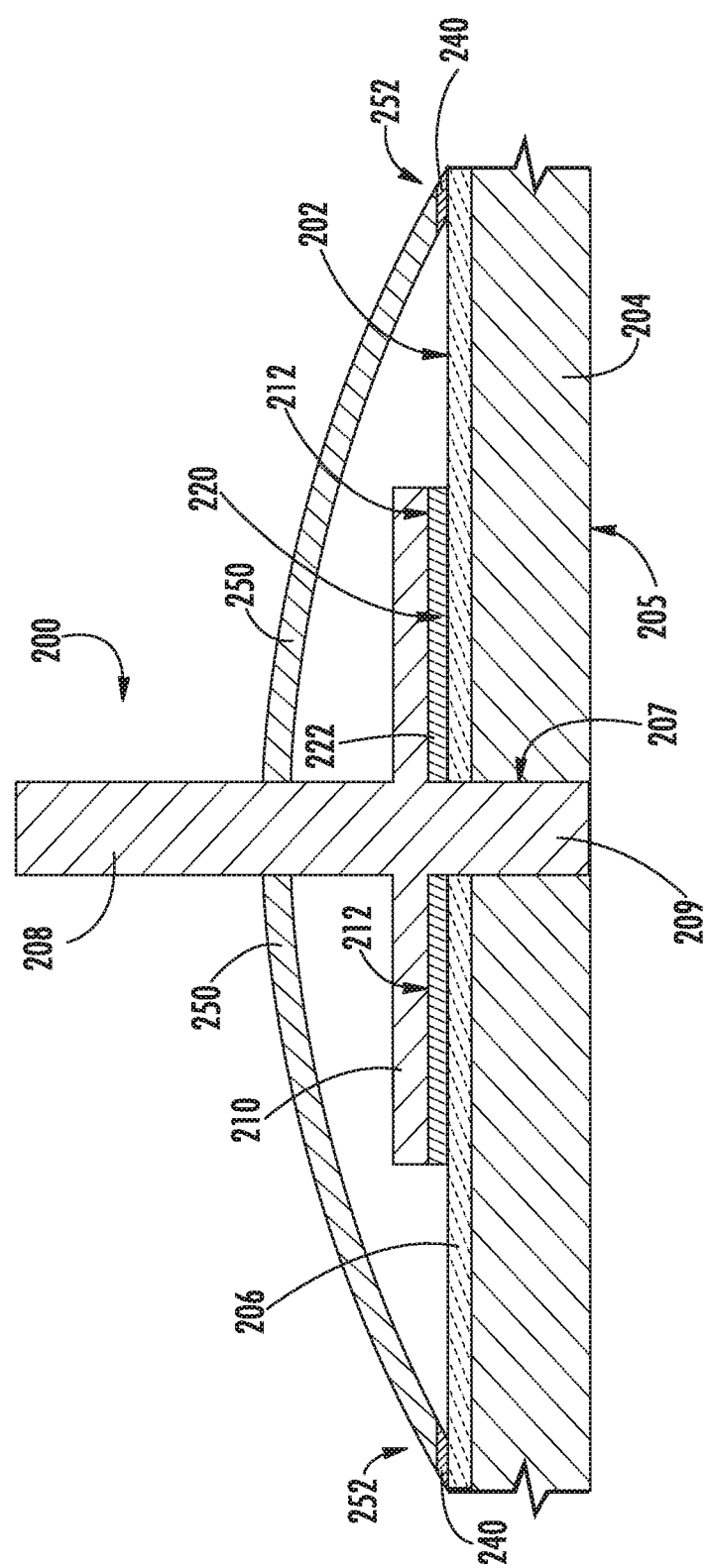
FIG. 3 is a cross-sectional view of an exemplary substrate connected onto the outer surface of a ceramic component.

Turning now to FIG. 3, a substrate 200 is attached onto an outer surface 202 of a ceramic component 204, which may be a CMC component of a gas turbine engine. In the embodiment shown, the outer surface 202 is defined by an environmental barrier coating (EBC) 206 on the ceramic component 204. However, it is to be understood that the presence of the EBC 206 is optional on the outer surface 202 and not required in all circumstances, such as when the outer surface 202 is not within the hot gas flow path of a turbine engine. For example, when the ceramic component 204 is a combustion liner with the outer surface 202 being external to the hot gas path within the engine.

In one embodiment, the substrate 200 is a sensor to measure a property of the environment on the opposite, inner surface 205 of the ceramic component 204. In the embodiment shown, for example, the substrate 200 includes a stem 208, a probe 209, and a plate 210. The plate 201 generally surrounds the stem 208 and probe 209 to define an attachment surface 212 of the substrate 200. That is, the plate 201 serves as a washer support for the probe 209 and the stem 208. The probe 209 may include a sensor configured to measure temperature, pressure, or other environmental properties, while the stem 208 may be a conduit for communication between the sensor and a receiver (not shown). The probe 209 may extend through an aperture 207 (e.g., a film hole) defined within the ceramic component 204.

In one embodiment, the substrate 200 may be formed of any of a variety of metals or metal alloys, including those based on nickel, cobalt and/or iron alloys or superalloys. In one embodiment, substrate 302 is made of a nickel-base alloy, and in another embodiment substrate 302 is made of a nickel-base superalloy. A nickel-base superalloy may be strengthened by the precipitation of gamma prime or a related phase. In one example, the nickel-base superalloy has a composition, in weight percent, of from about 4 to about 20 percent cobalt, from about 1 to about 10 percent chromium, from about 5 to about 7 percent aluminum, from about 0 to about 2 percent molybdenum, from about 3 to about 8 percent tungsten, from about 4 to about 12 percent tantalum, from about 0 to about 2 percent titanium, from about 0 to about 8 percent rhenium, from about 0 to about 6 percent ruthenium, from about 0 to about 1 percent niobium, from about 0 to about 0.1 percent carbon, from about 0 to about 0.01 percent boron, from about 0 to about 0.1 percent yttrium, from about 0 to about 1.5 percent hafnium, balance nickel and incidental impurities. For example, a suitable nickel-base superalloy is available by the trade name Rene N5, which has a nominal composition by weight of 7.5% cobalt, 7% chromium, 1.5% molybdenum, 6.5% tantalum, 6.2% aluminum, 5% tungsten, 3% rhenium, 0.15% hafnium, 0.004% boron, and 0.05% carbon, and the balance nickel and minor impurities.

A connection 220 is formed by an adhesive system 222 to secure the attachment surface 212 of the substrate 200 onto the outer surface 202 of the ceramic component 204. Since the composition of the substrate 200 (e.g., a metal) is significantly different than the composition of the ceramic component 204 (e.g., a CMC material), a multi-layer adhesive system 222 is utilized to form the connection 220 between the attachment surface 212 of the substrate 200 onto the outer surface 202 of the ceramic component 204 such that the a high temperature cement may sufficiently adhere to both materials. The adhesive system 222 is shown in greater detail in FIGS. 4A, 4B, 5A, 5B, and 6, as described below.

Figure 4A:
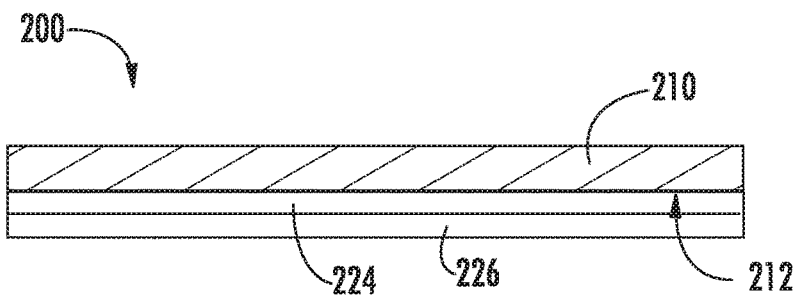
FIG. 4A is a cross-sectional view of an exemplary substrate having a bond coating on its attachment surface and a alumina coating on the bond coating.

FIG. 4A shows a cross-sectional view of a plate 210 of an exemplary substrate 200. As shown, a bond coating 224 is on the attachment surface 212. The bond coating 224 is shown directly on the attachment surface 212 so as to form a sufficient bond between the attachment surface 212 and the subsequent layers thereon. However, in other embodiments, additional layer or layers may be positioned therebetween. In embodiments where the substrate 200 is formed from a metal or metal alloy, the bond coating 224 is constructed from a metal, metallic, intermetallic, metal alloy, or combinations thereof. In one embodiment, the bond coating 224 may include some combination of Ni and Al, either alone or in combination with other metals. For example, the bond coating 224 may include a NiAl material, such as a predominantly beta NiAl phase with limited alloying additions. For instance, the NiAl coating may have an aluminum content of from about 9 to about 12 weight percent, balance essentially nickel, and in another embodiment, have an aluminum content from about 18 to about 21 weight percent aluminum, balance essentially nickel. However, the composition of the bond coating 224 is not limited to NiAl bond coats, and may be any metallic coating with an appropriate bonding and temperature capability. For example, the bond coating 224 may be a NiCrAlY coating, such as a NiCrAlY coating having a composition of (by weight) about 21.0% to about 23.0% chromium, about 9% to about 11% aluminum, 0.05% to about 1.20% yttrium, 0% to about 0.01% phosphorous, 0% to about 0.01% nitrogen, 0% to about 0.040% oxygen, and the balance nickel. In particular embodiments, other reactive elements can be included in addition to, or instead of, yttrium. For example, the bond coating 224 may include, in combination with a NiCrAlY compound, compounds including materials of NiCrAlZr, NiCrAlHfSi, NiCrAlYZr, NiCrAlReY, or combinations thereof. The inclusion of such material may help adhesion of the attachment surface 212 to the adhesive system 222.

The bond coating 224 has, in particular embodiments, a thickness on the attachment surface 212 of about 25 µm to about 100 µm (e.g., about 50 µm to about 75 µm). The bond coating 224 may be formed on the attachment surface 212 by any suitable method, including but not limited to physical vapor deposition (PVD) techniques, chemical vapor deposition techniques, low pressure plasma spray (LPPS) techniques, air plasma spray (APS), etc.

In the embodiment shown in FIG. 4A, an alumina coating 226 is on the bond coating 224. The alumina coating 226 is shown directly on the bond coating 224, but may have another layer or layers therebetween. In one embodiment, the alumina coating 226 includes aluminum and oxygen (e.g., aluminum (III) oxide), but may include other materials in lesser amounts. The alumina coating 226 has a thickness on the bond coating 224 of about 25 µm to about 100 µm (e.g., about 50 µm to about 75 µm). The alumina coating 226 may be formed on the bond coating 224 by any suitable method, including but not limited to physical vapor deposition (PVD) techniques, chemical vapor deposition techniques, low pressure plasma spray (LPPS) techniques, air plasma spray (APS), etc.

Figure 4B:
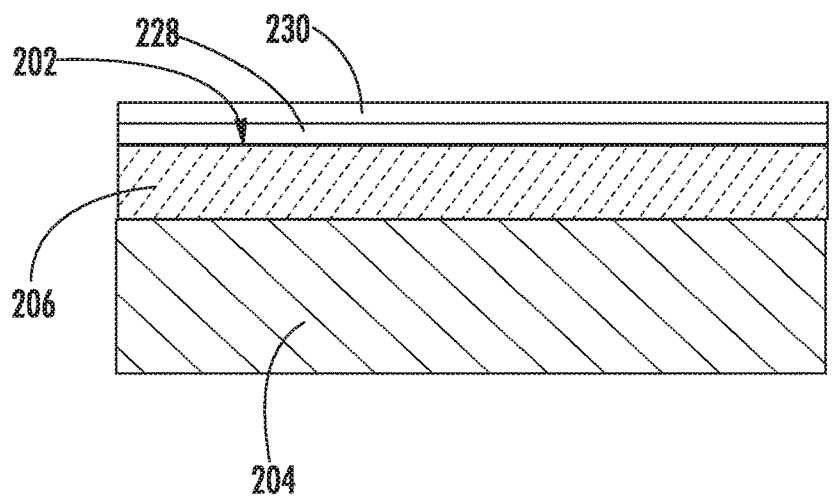
FIG. 4B is a cross-sectional view of an exemplary ceramic component having a bond coating on its outer surface and a alumina coating on the bond coating.

On the other hand, FIG. 4B shows a cross-sectional view of a ceramic component 204 with the optional EBC 206 defining its outer surface 202. As shown, a bond coating 228 is on the outer surface 202 so as to form a sufficient bond between the attachment surface 212 and the subsequent layers thereon. However, in other embodiments, additional layer or layers may be positioned therebetween. In embodiments where the ceramic component 204 includes a CMC material of silicon carbide, the bond coating 228 may be constructed from a silicon-containing material (e.g., pure silicon metal or a silicon alloy), and may form a thermally grown oxide (TGO) layer (e.g., of silicon oxide) thereon. The bond coating 228 has a thickness on the outer surface 202 of about 50 μm to about 150 μm (e.g., about 75 μm to about 125 μm). The bond coating 228 may be formed on the outer surface 202 by any suitable method, such as described above.

In the embodiment shown in FIG. 4B, an alumina coating 230 is on the bond coating 228. The alumina coating 230 is shown directly on the bond coating 228, but may have another layer or layers therebetween. In one embodiment, the alumina coating 230 includes aluminum and oxygen (e.g., aluminum (III) oxide), but may include other materials in lesser amounts. The alumina coating 230 has a thickness on the bond coating 228 of about 25 μm to about 100 μm (e.g., about 50 μm to about 75 μm). The alumina coating 230 may be formed on the bond coating 228 by any suitable method, such as described above.

Figure 5A:
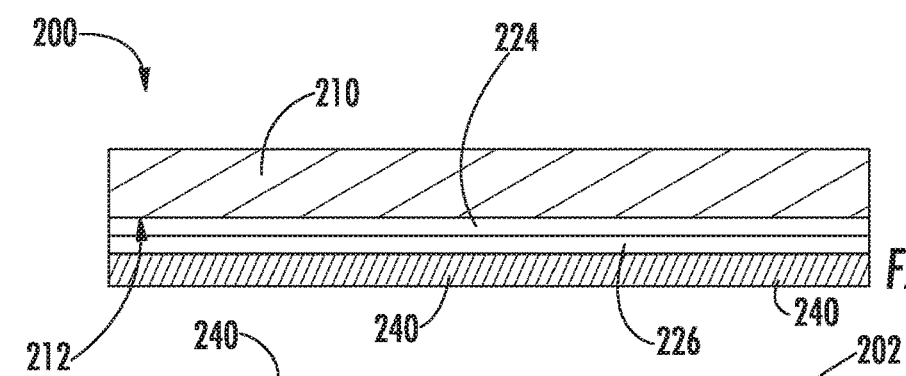
FIG. 5A is a cross-sectional view of the exemplary substrate of FIG. 4A with a cement applied over the alumina coating.
Figure 5B:
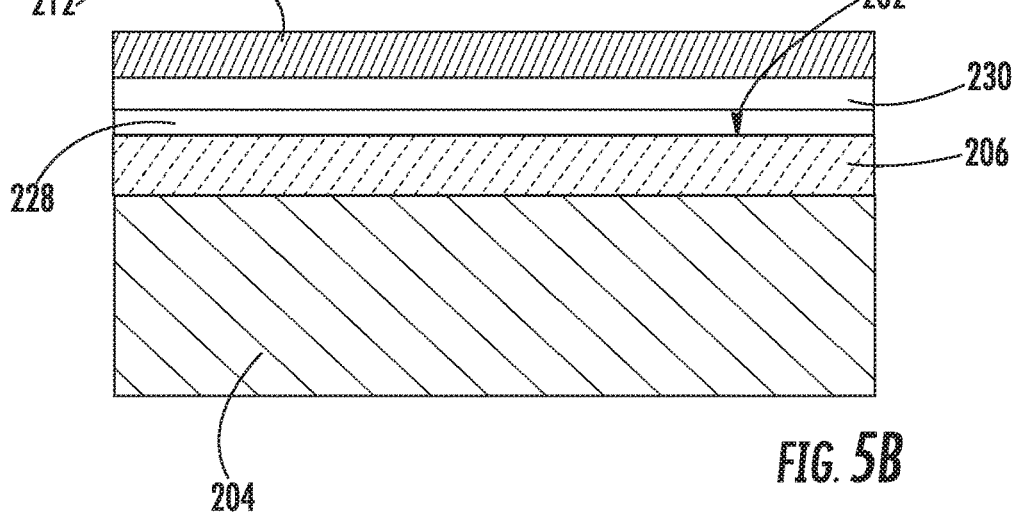
FIG. 5B is a cross-sectional view of the exemplary ceramic component of FIG. 5A with a cement applied over the alumina coating.
Figure 6:
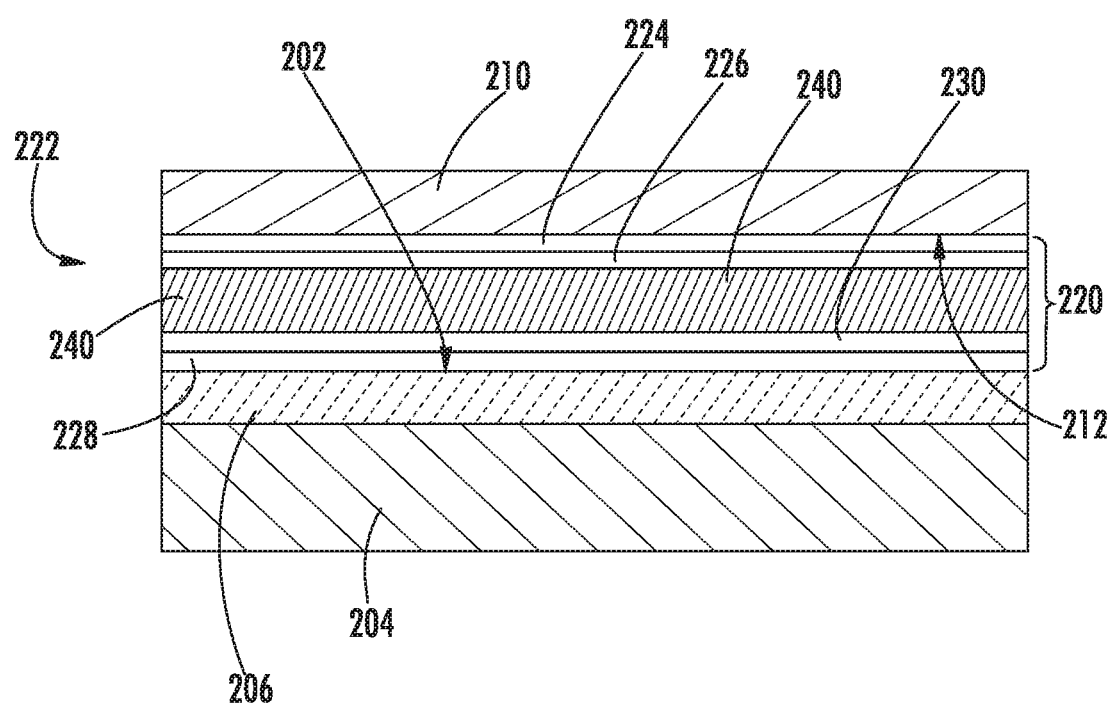
FIG. 6 shows the exemplary substrate of FIG. 5A connected to the exemplary ceramic component of FIG. 5B.

Referring to FIGs. 5A and 5B, a cement 240 may be applied on either or both of the alumina coatings 226, 230 after the bond coatings 224, 228 and alumina coatings 226, 230 are formed on the respective surfaces 212, 202. The cement 240 may be applied to either surface to a thickness that is up to about 150 μm (e.g., about 75 μm to about 125 μm). Then, the attachment surface 212 may be adhered to the outer surface 202, as shown in FIG. 6, to form the connection 220.

Generally, the cement 240 may be a high temperature cement, such as an alumina adhesive (e.g., the high purity, alumina adhesive available under the tradename Resbond™ 989FS from Cotronics Corp., NY). Such an alumina adhesive is particularly suitable for use as the cement due to the presence of the alumina coatings 226, 230 on the respective surfaces 212, 202 to create a strong bond therebetween.

Referring again to FIG. 3, a pair of retainer arms 250 extend from the stem 208 to their respective terminal ends 252. The cement 240 may be utilized to adhere the terminal end 252 of each retainer arm 250 onto the outer surface 202 of the ceramic component 204. Although shown with 2 retainer arms 250, any suitable number of retainer arms 250 may be utilized as desired. In this embodiment, the mechanical retention of the retainer arms 250 is combined with the strengths of the high temperature cement that adheres to the alumina coatings. Thus, the substrate 200 is securely adhered onto the ceramic component 204.

As such, the present disclosure is generally applicable to securing substrates (e.g., metal substrates) onto ceramic components (either directly or onto a EBC system). Notable examples of such components include the high and low pressure turbine nozzles (vanes), shrouds, combustor liners, combustor domes and heat shields, transition pieces, turbine frame and augmenter hardware of gas turbine engines. While this disclosure is particularly applicable to turbine engine components, the teachings of this disclosure are generally applicable to any component on which a thermal barrier may be used to thermally insulate the component from its environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A connection between a metal substrate and a ceramic component, comprising:
a first bond coating and a first alumina coating on an attachment surface of the metal substrate, the metal substrate comprising a stem, a probe and a plate, the plate extending outwardly from the stem and the probe between at least one retainer arm and the ceramic component, the at least one retainer arm extending from the stem and spaced apart from the plate, the attachment surface being on the plate;
a second bond coating and a second alumina coating on an outer surface of the ceramic component; and
a cement directly on the first alumina coating and the second alumina coating, wherein the first alumina coating and the second alumina coating face each other, and wherein a first portion of the cement is in contact with the first alumina coating and a second portion of the cement is in contact with the second alumina coating, and wherein the ceramic component defines an aperture, the aperture configured for the probe to extend through the ceramic component, the probe configured to measure an environmental property on an inner surface of the ceramic component.

2. The connection as in claim 1, wherein the ceramic component comprises a ceramic matrix composite.

3. The connection as in claim 2, wherein the ceramic component is a flowpath component of a gas turbine engine.

4. The connection as in claim 1, wherein the ceramic component is a combustion liner of a gas turbine engine, and wherein the probe of the metal substrate is a pressure probe extending into the aperture.

5. The connection as in claim 1, wherein the first bond coating is directly on the attachment surface of the metal substrate, and wherein the first alumina coating is directly on the first bond coating; and wherein the second bond coating is directly on the outer surface of the ceramic component, and wherein the second alumina coating is directly on the second bond coating.

6. The connection as in claim 1, wherein the first bond coating comprises NiCrAlY, and wherein the first bond coating has a thickness of about 25 μm to about 100 μm, and further wherein the first alumina coating has a thickness of about 25 μm to about 100 μm.

7. The connection as in claim 1, wherein the second bond coating comprises silicon metal, and wherein the second bond coating has a thickness of about 50 μm to about 150 μm, and further wherein the second alumina coating has a thickness of about 25 μm to about 100 μm.

8. The connection as in claim 1, wherein the connection further comprises the at least one retainer arm extending from the stem to a terminal end, the terminal end spaced apart from the plate, wherein the first portion of the cement is directly on the first alumina coating and the second portion of the cement is directly on the second alumina coating, and wherein the at least one retainer arm is adhered to the outer surface of the ceramic component via a third cement portion.

9. The connection as in claim 1, wherein the probe comprises a sensor configured to measure the environmental property on an inner surface of the ceramic component, the inner surface being opposite the outer surface of the ceramic component.

10. The connection as in claim 1, wherein the at least one retainer arm extends from the stem to a terminal end, the terminal end being adhered to the outer surface of the ceramic component.

11. The connection as in claim 1, wherein the first bond coating is directly on the plate.

12. The connection as in claim 3, further comprising an environmental barrier coating on the outer surface of the ceramic component.

13. The connection as in claim 12, wherein the ceramic component is a combustion liner of the gas turbine engine.

* * * * *